(12) United States Patent  
Kreiner et al.

(10) Patent No.: US 7,533,110 B2  
(45) Date of Patent: *May 12, 2009

(54) FILE CONVERSION

(75) Inventors: Barrett M. Kreiner, Norcross, GA (US); Jonathan L. Reeves, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/191,560

(22) Filed: Jul. 28, 2005

(65) Prior Publication Data

US 2005/0257129 A1 Nov. 17, 2005

Related U.S. Application Data

(63) Continuation of application No. 10/209,102, filed on Jul. 31, 2002, now Pat. No. 7,024,415.

(51) Int. Cl.
  *G06F 17/30* (2006.01)
  *G06F 17/00* (2006.01)
(52) U.S. Cl. .......................... 707/101; 707/10; 715/234
(58) Field of Classification Search ................. 707/1–4, 707/5, 6, 10, 100, 101, 102, 104.1, 200, 201, 707/202, 203, 204, 205; 709/200, 201, 202, 709/203, 204, 205, 206, 217, 218, 219, 23, 709/246, 247; 345/700, 716, 719, 733, 744, 345/760, 853, 866; 715/205, 209, 234, 239, 715/712, 733, 854; 379/90.01, 93.25; 719/315; 704/270.1

See application file for complete search history.

(56) References Cited

U.S. PATENT DOCUMENTS

| | | | | |
|---|---|---|---|---|
| 6,104,872 A * | 8/2000 | Kubota et al. | ................ | 717/110 |
| 6,928,452 B2 * | 8/2005 | De La Huerga | ............. | 707/102 |
| 7,017,162 B2 * | 3/2006 | Smith et al. | .................. | 719/328 |
| 7,136,908 B2 * | 11/2006 | Cline et al. | .................. | 709/220 |
| 7,366,762 B2 * | 4/2008 | Cama | .......................... | 709/206 |
| 2001/0044811 A1 * | 11/2001 | Ballantyne et al. | ........... | 707/513 |
| 2003/0140068 A1 * | 7/2003 | Yeung | ......................... | 707/204 |
| 2003/0154185 A1 * | 8/2003 | Suzuki et al. | ................... | 707/1 |
| 2005/0114757 A1 * | 5/2005 | Sahota et al. | ............. | 715/501.1 |
| 2007/0288553 A1 * | 12/2007 | Donaghey et al. | ........... | 709/203 |

* cited by examiner

*Primary Examiner*—Diane Mizrahi  
(74) *Attorney, Agent, or Firm*—Withers & Keys, LLC

(57) ABSTRACT

A file conversion system includes a filter and conversion tool and an Hypertext Markup Language (HTML) to Extensible Hypertext Markup Language (XHTML) tool. The filter and conversion tool reads a first file comprises a first digital content item and a corresponding first indication of style to be applied to the first digital content item and a second digital content item and a corresponding second indication of style to be applied to the second digital content item. The filter and conversion tool modifies the first file to remove the first digital content item from the first file and converts the modified first file to a second file comprising the second digital content item and a HTML tag based on the second style indication of the first file. The HTML to XHTML tool converts the second file to a third file comprising XHTML tags.

15 Claims, 4 Drawing Sheets

FILE CONVERSION

CROSS-REFERENCE TO RELATED APPLICATIONS

This application is a continuation application and claims priority under 35 U.S.C. §120 and §121 to U.S. patent application Ser. No. 10/209,102 filed Jul. 31, 2002 now U.S. Pat. No. 7,024,415, which is herein incorporated by reference in its entirety.

FIELD OF THE INVENTION

The invention generally relates to the field of computing. More particularly, the invention relates to conversion of files for display with a particular display format.

BACKGROUND OF THE INVENTION

A great deal of business documents are stored as electronic files. These files are generally created via document processing applications, such as, for example, a Microsoft® Word word processing application, a Microsoft® Excel spreadsheet application, a WordPerfect® word processing application, Mircosoft® PowerPoint® presentation application, and the like. These applications store the documents as electronic files in various formats, such as, for example, a Microsoft® Word file format, a Microsoft® Excel file format, a WordPerfect® file format, and the like. The files include digital content items (e.g., text strings. graphics, and the like) and display formatting information (e.g., font styles, alignment, and the like) of how to print and display the digital content items as a document. Such display formatting information often makes the document much easier for a user to read and comprehend.

It would be convenient if the user could access documents (in a formatted form) from a user/client computer via the Internet. To this end, various approaches have been taken, each of which, however, suffers from some disadvantage. A straightforward approach is to simply transmit the file over the Internet to the client computer, however, to display the file as a document, the client computer typically needs to have the same word processing application that originally created the file. Also, the client computer typically needs to have the same version of the word processing application.

Another approach includes converting a document to an image file and transmitting the image file over the Internet to the client computer (e.g., such as may be implemented with Adobe® Acrobat® software). A disadvantage with this approach is that, to display the image file as a document, the client computer typically needs an image displaying application. Also, the client computer typically needs to have a version of the image displaying application that corresponds to the application that converted the document to the image file. Moreover, image files are typically larger than word processing files and therefore, may take longer to be transmitted to the client computer. Further, procuring and maintaining such word processing and image displaying applications may become prohibitively expensive for a user.

Another option is to convert files to Hypertext Markup Language (HTML) files that can be transmitted over the Internet and displayed as a document by a conventional Internet browser on the client computer. The difficulty with this option is in converting the files to HTML files that display with an acceptable display format. One technique is manual conversion, which is tantamount to creating the HTML files from scratch and therefore, is generally prohibitively time consuming. Another technique is to use a conversion tool; however, existing conversion tools typically do not strictly comply with HTML. Therefore, such conversion tools often yield files that, when displayed as documents on a browser, are difficult for the user to read.

In view of the foregoing, there is a need for a method and system for converting files to files that display with a particular display format.

SUMMARY

A file conversion system includes a filter and conversion tool and an Hypertext Markup Language (HTML) to Extensible Hypertext Markup Language (XHTML) tool. The filter and conversion tool reads a first file a first digital content item and a corresponding first indication of style to be applied to the first digital content item and a second digital content item and a corresponding second indication of style to be applied to the second digital content item. The filter and conversion tool modifies the first file to remove the first digital content item from the first file and converts the modified first file to a second file comprising the second digital content item and a HTML tag based on the second style indication of the first file. The HTML to XHTML tool converts the second file to a third file comprising XHTML tags.

The above-listed features, as well as other features, of the system and method will be more fully set forth hereinafter.

BRIEF DESCRIPTION OF THE DRAWINGS

Illustrative embodiments of systems and methods for file conversion are further described in the detailed description that follows, by reference to the noted drawings, in which like reference numerals represent similar parts throughout the drawings, and wherein.

DETAILED DESCRIPTION OF ILLUSTRATIVE EMBODIMENTS

Figure 1:
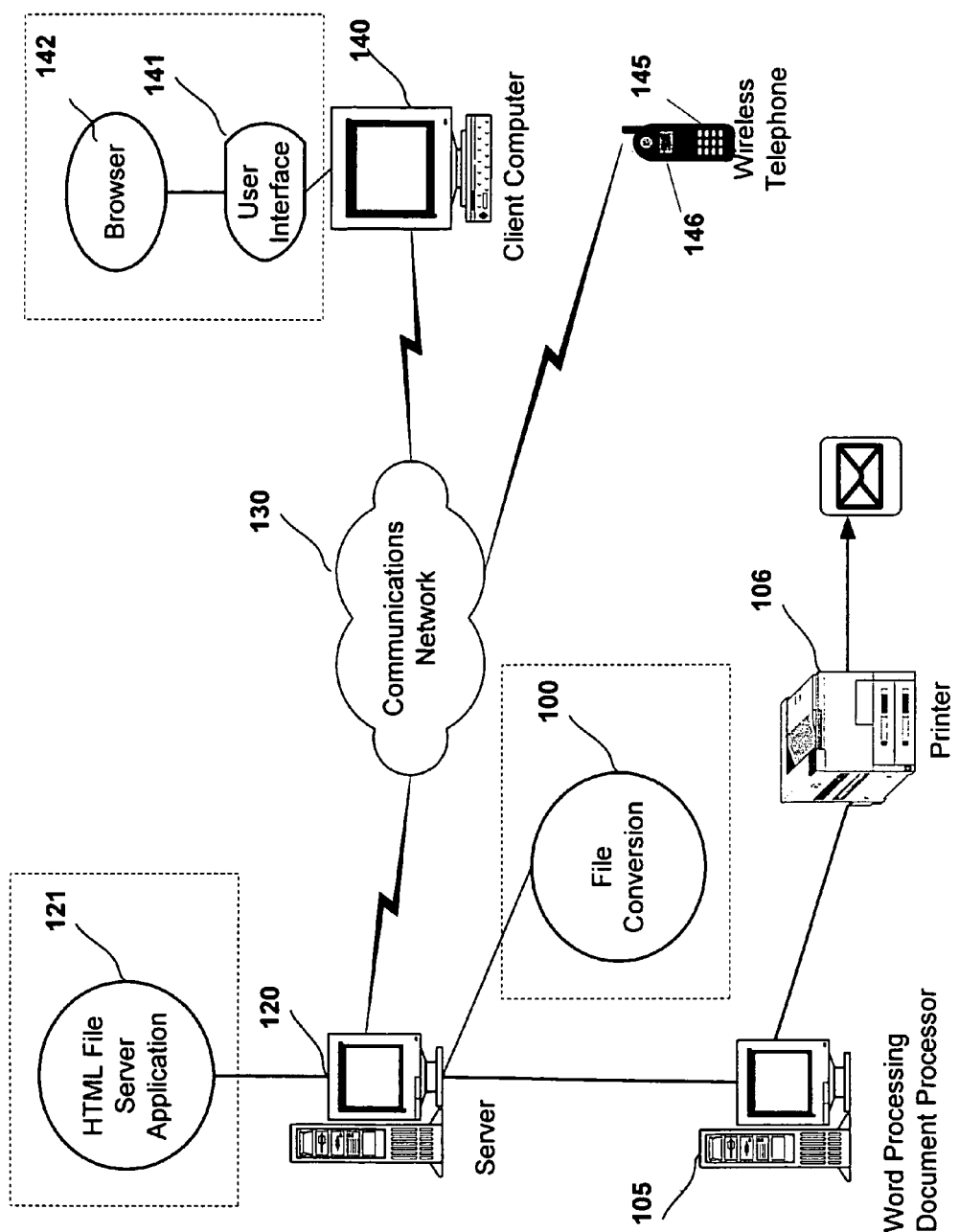
FIG. 1 is a diagram of an exemplary network environment in which file conversion may be implemented and an illustrative system for converting a source file to an Extensible Hypertext Markup Language (XHTML) file for display with a predefined display format.

FIG. 1 shows an exemplary network environment in which file conversion may be implemented, although it should be understood that it need not be implemented in a network environment. As shown in FIG. 1, server 120 is in communication with client computer 140 via communications network 130. In this exemplary environment, communications network 130 is the Internet; however, communications network 130 can also be, for example, a local area network (LAN), a wide area network (WAN), an intranet, or the like. In a network environment in which communications network 130 is the Internet, server 120 is known as a Web server. Server 120 and client computer 140 can communicate with each other via any mutually agreeable protocol, such as the well known hyper-text transfer protocol (HTTP), for example. Although FIG. 1 shows a network environment with one server and one client, it should be understood that the network could include any number of clients and servers.

Typically, client computer 140 interfaces with communications network 130 via a browser 142 that enables a user at client computer 140 to access Web sites, Web pages, and the like. Such browsers 142 are typically configured to communicate via HTTP and to display information based on Hypertext Markup Language (HTML). Browser 142 may comprise any of several commercially available software browsers including, for example, Microsoft® Internet Explorer and Netscape® Navigator.

Client computer 140 includes a user interface 141 to display information, for example, in the form of a web page and to allow the user to enter information into client computer 140.

To communicate with server 120, the user at client computer 140 executes browser 142 and then enters an address, such as a domain name (for example, "www.bellsouth.com") or a Universal Resource Locator (URL) (for example, "http://www.bellsouth.com/web-server.htm"). If the URL "http://www.bellsouth.com/web-server.htm" is entered, browser 142 breaks the URL into 3 parts: the protocol ("http"), the server name ("www.bellsouth.com"), and the file name ("web-server.htm"). In either case, browser 142 communicates with a domain name server ("DNS") (not shown) to translate the server name (www.bellsouth.com) into an Internet Protocol ("IP") address. Browser 142 then uses the IP address to communicate between client computer 140 and server 120 via communications network 130.

Server 120 may also be accessed by other devices capable of communicating via communications network 130, including a cellular phone 145. As shown, cellular phone 145 includes a user interface 146. User interface 146 of cellular phone 145 may have different capabilities from user interface 141 of client computer 140. For example, user interface 141 typically is capable of displaying colors, graphics, bold font style, and the like. User interface 146, however, typically is only capable of displaying text and has a smaller display area than that of user interface 146. As such, files may need to include different display formatting information to be properly displayed on the various devices that can communicate with server 120. Other devices may further include a personal digital assistant, a data appliance, and the like.

Returning now to client computer 140, browser 142 may request and receive a file from server 120 and display the file as a document on user interface 141. Browser 142 typically requests HTML files and therefore, server 120 includes an HTML file server application 121 that receives requests and sends the requested HTML file to client computer 140.

Many existing documents, however, are not stored as HTML files, but rather are stored as word processing files having a word processing file format, for example. Such word processing files are typically stored on word processing document processor 105. Conventionally, these documents are disseminated to users on paper. As such, word processing document processor 105 is in communication with printer 106 for printing documents from the word processing files. As an example of such document dissemination, if a user purchases a telephone feature (e.g., call forwarding), operating instructions for that feature are printed using printer 106 and mailed to the user. Such printing and mailing, however, is a relatively expensive technique for disseminating documents. Further, it may be inconvenient for the user to store a printed version of the document. That is, it may be simpler for the user to be able to access the operating instructions via communication network 130 and browser 142 when desired.

Conventional browsers 142, however, may not be able to properly display a word processing formatted file as a document. One solution is for client computer 140 to include the same word processing application and version with which the file was originally created. In this case, client computer 140 is able to display the document using the word processing application. Word processing applications, however, may be relatively expensive. Further, because documents are stored in various file formats (e.g., a word processing file format, a spreadsheet file format, and the like), client computer 140 may need to have several applications, such as, for example, a word processing application, a spreadsheet application, and the like. Moreover, client computer 140 may need to have the most recent version of these applications to be able to properly display the file as a document.

As an alternative to sending a word processing formatted file, the document may be converted to an image file and transmitted to client computer 140. Again, however, client computer 140 typically needs to have an image displaying application with an appropriate version. Moreover, such image files are typically large and therefore, it may take an unacceptably long time to download the image file to client computer 140.

If, however, the word processing file or other source file corresponding to the document (i.e., a file that is a source of digital content items and display formatting information for the document) could be converted to an Extensible Hypertext Markup Language (XHTML) file, such as are compatible with conventional browsers 142, the XHTML file may be transmitted to client computer 140 and displayed by browser 142. File conversion system 100 provides such a conversion of source files to XHTML files. As shown, file conversion system 100 executes on server 120. Alternatively, file conversion system 100 may be executed on word processing document processor 105 or any appropriate processor. The converted XHTML files may then be stored on server 120 and served by HTML file server application 121 to client computer 140.

Figure 2:
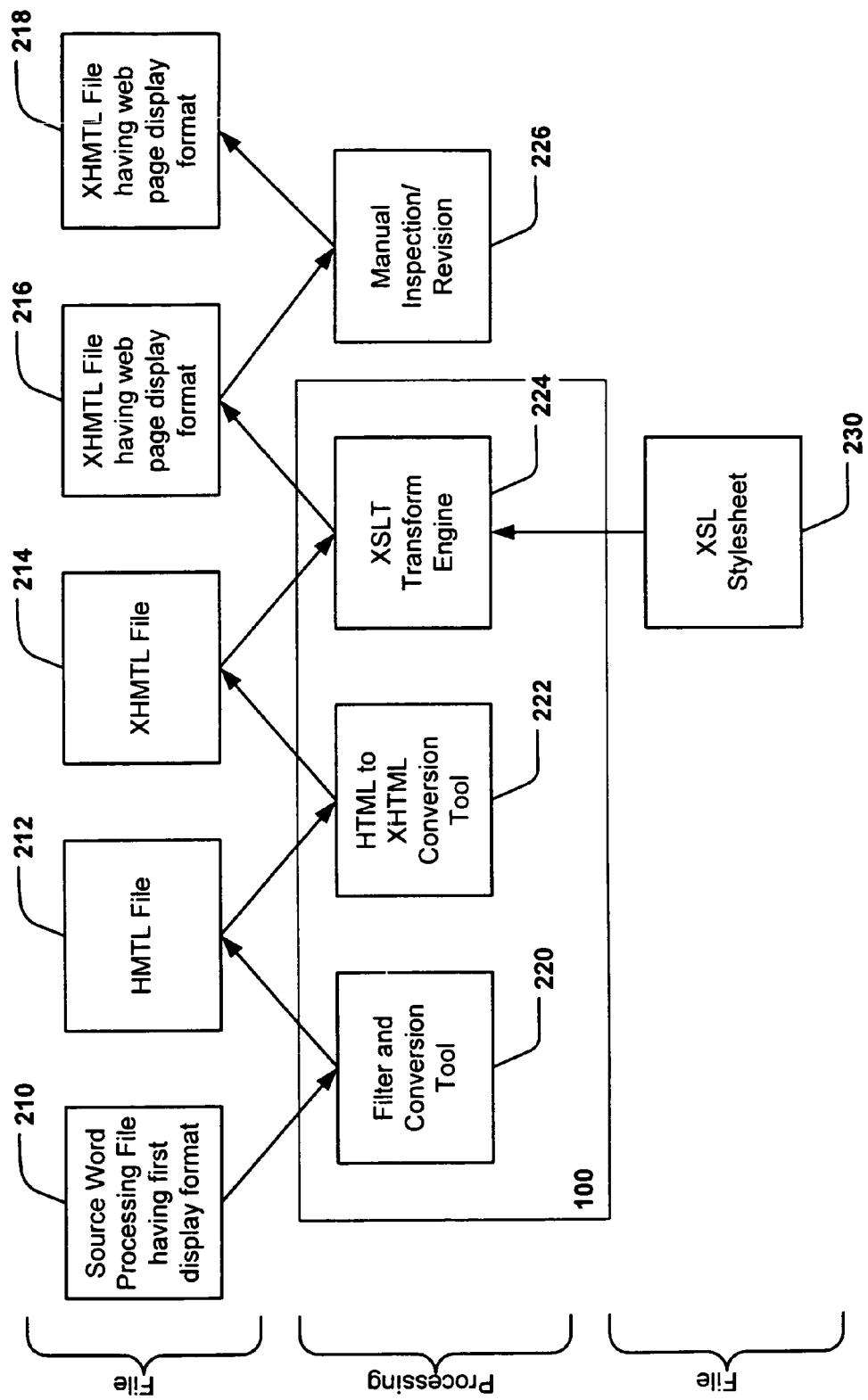
FIG. 2 is a diagram of an illustrative system for converting a source file to an XHTML file for display with a predefined display format.

As shown in FIG. 2, file conversion system 100 comprises a filter and conversion tool 220, an HTML to XHTML conversion tool 222, and an Extensible Stylesheet Language Transformation (XSLT) engine 224. FIG. 2 also illustrates various files that may be created during the illustrative file conversion. For example, as shown in FIG. 2, file conversion system 100 receives an exemplary source file 210 and converts it to an XHTML file 216. During the conversion process, several interim files may be created, such as HTML file 212 and XHTML file 214. Such interim files, however, need not be created, but for clarity will be described as being created during the conversion process.

Filter and conversion tool 220 converts from source file 210, which may be for example, a Microsoft® Word word processing file, a Microsoft® Excel spreadsheet file, a Word-Perfect® word processing file, and the like, to an HTML file. Source file 210 includes digital content items (e.g., words and images) and display formatting information (e.g., an indication to apply a boldface font style to a corresponding digital content item) indicating formatting to be applied to the digital content items for display. In source file 210, the display formatting information is typically specific to the application (e.g., a word processing application) that created source file 210.

Filter and conversion tool 220 comprises two portions. A first portion of filter and conversion tool 220 modifies source file 210 to remove some digital content items. The second portion of filter and conversion tool 220 converts the modified source file to an HTML file. While filter and conversion tool 220 may be implemented in one portion, the second portion is commercially available (as described in more detail below). thereby making implementation in two portions convenient. The commercially available tool, however, does not provide filtering of undesirable digital content items.

Therefore, first portion of filter and conversion tool 220 modifies source file 210 to remove some undesirable digital content items. For example, source file 210 may contain page numbers (i.e., digital content items) that may not be desired in a browser display because page numbering may not make sense in the context of a browser display. Other undesirable digital content items may include, for example, revision information, header information, footer information, graphic information, and the like. Such digital content items may be contained in various portions of source file 210, such as, for example, a body portion, a header portion, a footer portion, a table portion, and the like. The undesirable digital content items may be determined in a variety of ways, as described in more detail below.

After the first portion of filter and conversion tool 220 removes the undesirable digital content items, the second portion of filter and conversion tool 220 converts the modified source file to HTML file 212. The second portion of filter and conversion tool 220 is commercially available from Microsoft Corp., Redmond, Seattle. The second portion of filter and conversion tool 220 reads from source file 210, digital content items and indications of style to be applied to the digital content items. The second portion of filter and conversion tool 220 then creates an HTML file 212 that contains the digital content items (i.e., the digital content that were not removed by the first portion of tool 220) and also contains indications of style to be applied to the digital content items. In HTML file 212, however, the style indications are implemented in HTML rather than being implemented specifically for a word processing application, for example.

HTML is a set of markup symbols or codes inserted in a file intended for display on a browser page. The markup tells browser 142 how to display a digital content item. Each individual markup code is referred to as an element or a tag. Some tags come in pairs that indicate when some display format or style is to begin and end.

HTML is a formal recommendation by the World Wide Web Consortium (W3C) and is generally adhered to by the major browsers, such as, for example, Microsoft's® Internet Explorer and Netscape's® Navigator. Both Internet Explorer and Netscape®, however, implement some features differently from standard HTML and provide non-standard extensions of HTML. As such, some browsers may be unable to properly display a particular form of HTML, such as is often created by commercially available conversion tools.

To provide improved displays on browser 142, XHTML may be used. XHTML is a reformulation of HTML as an application of Extensible Markup Language (XML). XML is extensible in that a user can invent a particular set of markup for a particular purpose. XML allows files to be adapted and used for many purposes, including describing the style and appearance of digital content items in a browser page. That being the case, HTML was reformulated in terms of XML, thereby resulting in XHTML.

Unlike HTML, XHTML can be extended by anyone that uses it. New elements and attributes can be defined and added to those that already exist, making possible new ways to embed digital content items and programming in a browser page. The advantages of XHTML include extensibility and portability. Extensibility means that as new ideas for browser communication and presentation emerge, they can be implemented without having to wait for the next major version of HTML and browser support. Portability means that pages can be made simpler than they were before so that small devices (e.g., a data appliance) can display them. XHTML requires strict adherence to coding rules, in contrast to HTML which is much less rigorous about notation.

Generally, commercially available conversion tools generate HTML rather than XHTML. Accordingly, file conversion system 100 includes an HTML to XHTML conversion tool 222. HTML to XHTML conversion tool 222 converts from HTML file 212 to XHTML file 214. An HTML to XHTML conversion tool named HTML Tidy is commercially available from Source Forge and the World Wide Web Consortium.

XHTML file 214 may have the same display format as source file 210. That is, XHMTL file 214 may include the same formatting of the digital content items as in source file 210. If the same formatting is desired. XHMTL file 214 may be served by server 120 to browser 142 for display on client computer 140.

If a different format is desired, the display format may be converted. To convert the display format of XHTML file 214, file conversion system 100 includes XSLT Transform Engine 224. XSLT Transform Engine 224 may convert the existing style of the digital content items of XHTML file 214 based on an Extensible Stylesheet Language (XSL) Stylesheet 230 having predefined style conversion information. This yields XHTML file 216 which has a predefined style applied. For example, the style may be that associated with a web page display.

Finally, a manual inspection and revision 226 of XHMTL file 216 may be performed before using it for display purposes. Further, because source file 210 is often received in compressed form (to save disk space or to minimize network traffic associated with sending source file 210), file conversion system 100 may further include a compression application. Compression application may be WinZip that is commercially available from WinZip Computing, Inc.; however, any compression application may be used.

An exemplary document contains operating instructions for using a telephone call forwarding feature and includes a title of "Call Forwarding," a location of "From Home," a first step of "Lift receiver," and a second step of "Dial *77." The title is centered and in bold font style, the location is in blue text, the first step is in regular font style, and the second step is in bold font style. The document also includes a graphic (e.g., a graphic of a finger) next to the second step to indicate that this step entails dialing and a table having a purple background and indicating various audible tones and the meaning of the tones.

Exemplary source file 210, corresponding to the above-described document, includes a body portion, a header portion, and a footer portion. The body portion includes a title of "Call Forwarding," a location of "From Home," a first step of "Lift receiver," and a second step of "Dial *77." Source file 210 also includes an indication that the title is to be displayed centered and in bold font style, an indication that the location is to be displayed in blue text, an indication that the first step is to be displayed in regular font style, and an indication that the second step is to be displayed in bold font style. Source file 210 also includes a graphic (e.g., a finger), page numbers and an indication to display the page numbers in the footer portion, and a filename of "call forwarding instructions.doc" and an indication to display the filename in the header portion. Source file 210 further includes revision information, for example, a previous first step of "Lift telephone" that was subsequently revised to "Lift receiver." Such revision information may have been created with a track changes feature of a commercially available word processing application. Such a track changes feature often displays deleted text with hash marks through the deleted text; however, displaying such deleted text in a document is not desirable in a final product browser display. Also, source file 210 includes a table indicating various audible tones and the meaning of the tones and a style indicating to display the table background as purple.

Figure 3:
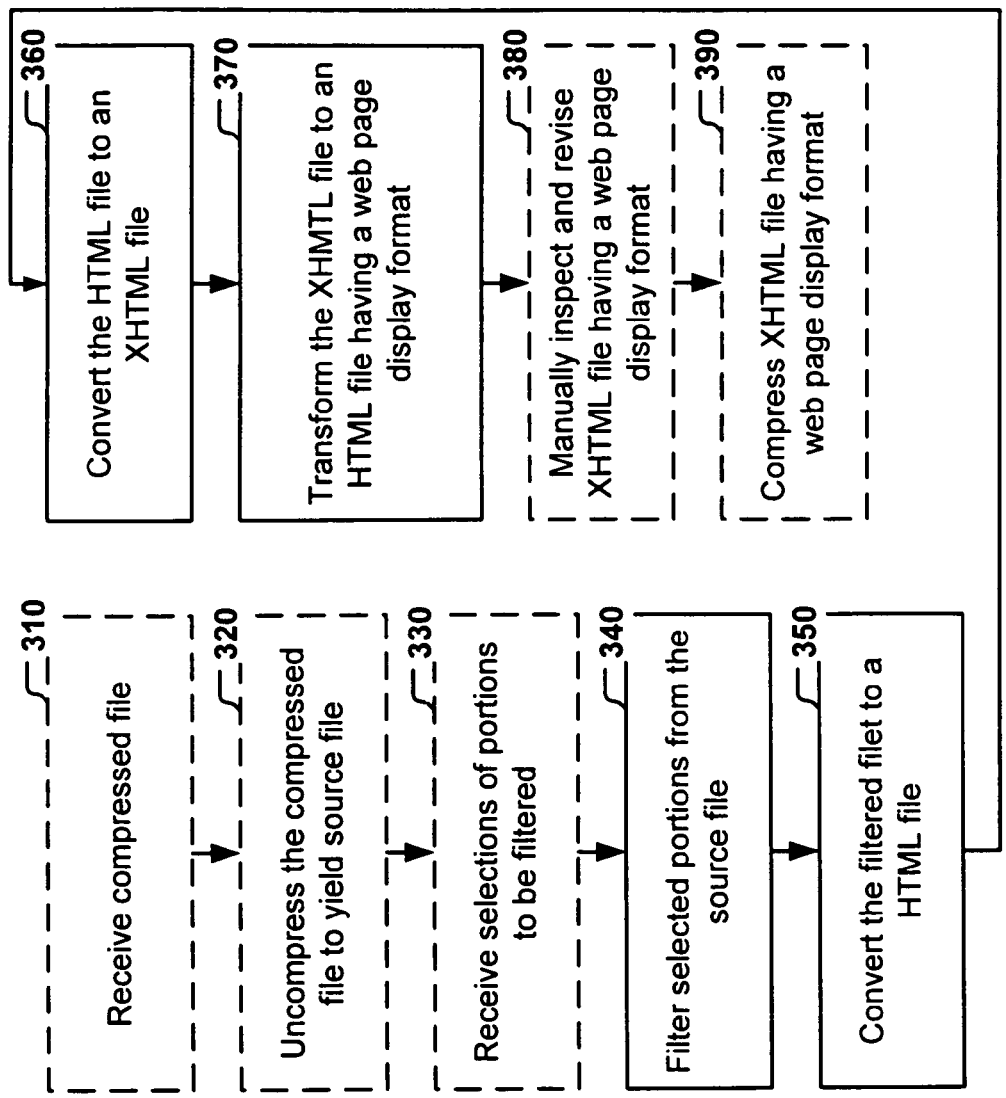
FIG. 3 is a flow diagram of an illustrative method for converting a source file to an XHTML file for display with a predefined display format.

FIG. 3 is a flow diagram of an illustrative method for converting source file 210 to XHTML file 216. At optional step 310, file conversion system 100 receives source file 210 in compressed form. File conversion system 100 may receive source file 210 via network 130, from a disk, or the like.

At optional step 320, the compressed source file is uncompressed to yield source file 210, for example, using a WinZip application.

At optional step 330, file conversion system 100 receives selections of portions of source file 210 or selections of types of digital content items to be removed. One technique for receiving such selections is to predefine such selections in file conversion system 100. For example, a selection to remove footer portions, header portions, and revision type of information may be predefined and stored in file conversion system 100.

An alternative technique is to display a prompt for user selection of portions of source file 210 or selections of types of digital content items to be removed. To receive such selections, file conversion system 100 may display on a user interface, indications of portions of source file 210 (e.g., a footer portion etc.) and indications of types of digital content items (e.g., revision type information etc.). File conversion system 100 may further display a selection field corresponding to each displayed portion and type. A user may select a portion or type to be removed by selecting (e.g., by clicking with a mouse) the field corresponding to that portion or type.

At step 340, file conversion system 100 modifies source file 210 to remove selected portions of source file 210 and selected types of digital content items. For exemplary source file 210, the selected portions may include the header portion, the footer portion, and the selected type may include revision type information. In response to such selections, filter and conversion tool 220 removes "call forwarding instructions.doc" because it is in the header portion, removes the page number because it is in the footer portion, and removes "Lift telephone" because it is a revision type of information.

At step 350, filter and conversion tool 220 converts the modified source file to an HTML file 212. HTML file 212 includes digital content items of source file 210 and for each digital content item may include a corresponding tag. For example, filter and conversion tool 220 reads the digital content item "Call Forwarding" and writes HTML tags of <centered> and <bold> before the item and HTML tags of </centered> and </bold> after the item. Filter and conversion tool 220 further reads the digital content item "From home" and writes an HTML tag of <blue> before the item and an HTML tag of </blue> after the item. Filter and conversion tool 220 also reads the digital content item "Lift receiver" and writes an HTML tag of <regular> before the item and an HTML tag of </regular> after the item. Filter and conversion tool 220 further reads the digital content item "Dial *77" and writes an HTML tag of <bold> before the item and an HTML tag of </bold> after the item. Filter and conversion tool 220 further reads the graphic and writes an HTML tag of <graphic> before the item and an HTML tag of </graphic> after the item. Filter and conversion tool 220 further reads the table and writes a HTML tags of <table> and <purple> before the item and HTML tags of </table> and </purple> after the item. Such HTML tags indicate style to be applied to the corresponding digital content item and are determined based on the display formatting information in source file 210.

As discussed above, conventional conversion tools do not provide conversion to XHMTL. Furthermore, many conventional conversion tools do not strictly adhere to HTML standards. Therefore, at step 360, HTML to XHMTL conversion tool 222 converts HTML file 212 to XHTML file 214. For example, HTML file may be processed by an HTML Tidy Tool configured to produce an XHMTL file.

At step 370, XSLT transform engine 224 applies XSL Stylesheet 230 to XHTML file 214. XSLT transform engine 224 yields XHTML file 216, which in this example, is for display as a web page on a web browser. As such, XSL Sytlesheet 230 includes a predefined display format for web page display.

XSL Sytlesheet 230 may include a mapping from a first display format to a predefined display format. To implement such a mapping, XSL Sytlesheet 230 may include a mapping between an XHTML tag and a predefined style to be applied to the digital content item associated with that XHTML tag. For example, to change the background color of tables to green, XSL Sytlesheet 230 may contain an XHTML tag of <table> and a style indication of <green>. In this case, XSLT transform engine 224 modifies the <purple> tags (associated with the tag <table>) to <green>. With such mapping, the display format of source file 210 may be changed to any desired display format.

At optional step 380, a manual inspection and revision of XHTML file 216 may be performed. While the method described above may appropriately convert the majority of source file 210, a final manual inspection is often performed to assure a high quality final product. If manual revisions are performed, XHMTL file 218 is generated.

At optional step 390, XHTML file 216 (or XHMTL file 218) is compressed, for example, for transmission to server 120.

As can be appreciated, a system and method is provided for converting a file having a first display format to a file having a web page display format. With such a system and method, a user may access files via the Internet and the files do not have to be completely manually converted from word processing files to HTML files. File conversion system 100 may be embodied in computer-readable instructions that automatically proceed, without user intervention, from steps 310 to 390. As such, the conversion process may be fully automated.

In addition, source files may be developed in a word processing environment (in which many users have proficiency generating and maintaining files) and then converted to be displayed in various formats for various devices. For example, source file 210 may be generated and maintained in a word processing environment, then converted for display as a web page for client computer 140 and also converted for display as text for cellular telephone 145. This provides the advantage of generating and maintaining files in a user-friendly word processing environment, while allowing various devices having different display capabilities to access the digital content items contained in the source file. Of course, the formatting of the digital content items will vary depending on the capabilities of the display device.

Figure 4:
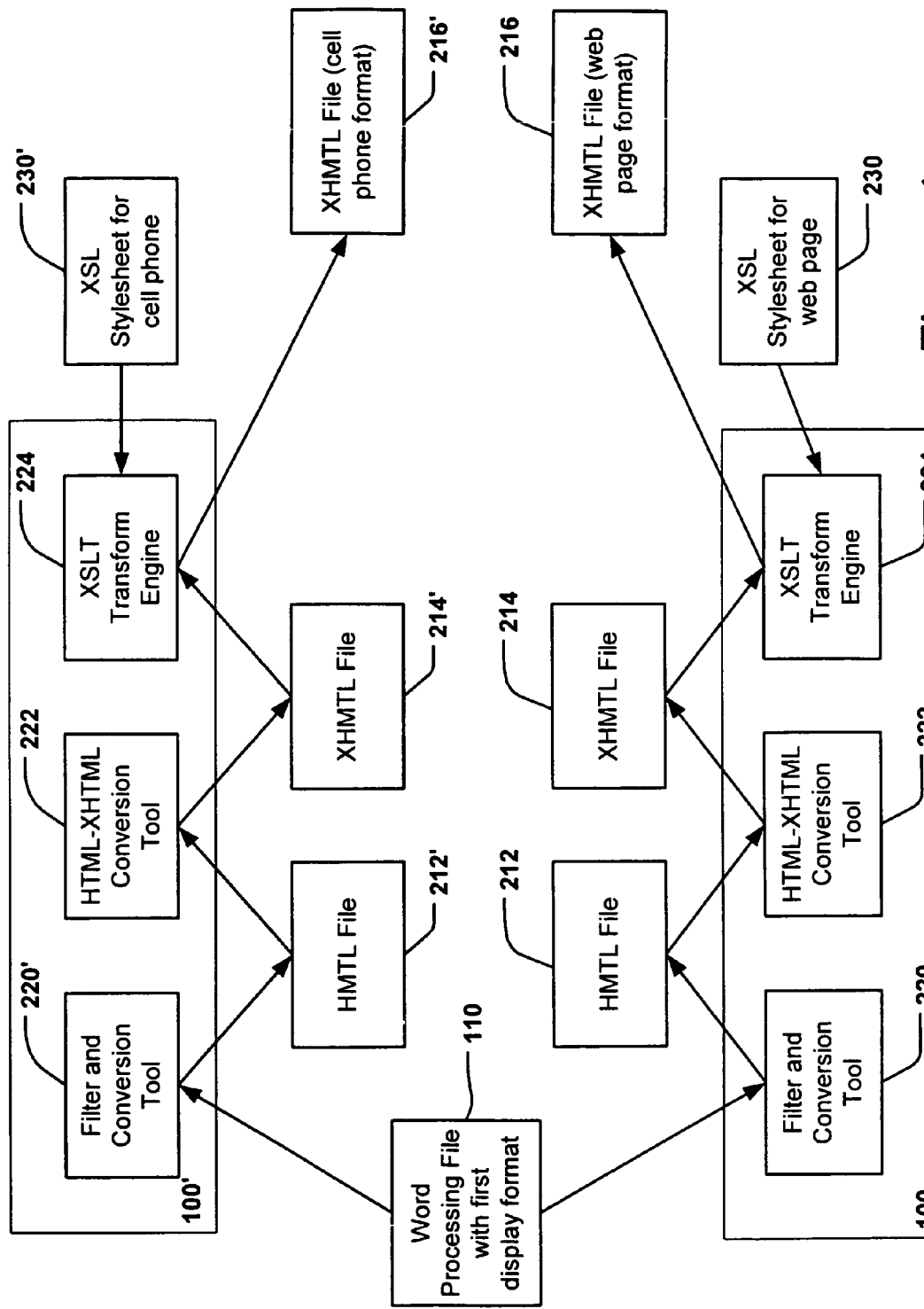
FIG. 4 is a diagram of an illustrative system for converting from a source file to a first XHTML file for display with a first predefined display format and to a second XHTML file for display with a second predefined display format.

FIG. 4 illustrates converting exemplary source file 210 to a first file for display on a web page and to a second file for display on a cellular telephone. As illustrated, XHTML document 216 may be generated in a manner similar to that described above in connection with FIG. 3. In addition, as illustrated in FIG. 4, a second file conversion system 100' is used to convert from source file 210 to a second XHTML file 216' for display on cell phone 145. As shown, file conversion system 100' comprises a filter and conversion tool 220', an HTML to XHTML conversion tool 222, and an Extensible Stylesheet Language Transformation (XSLT) engine 224.

First portion of filter and conversion tool 220' removes additional digital content items from source file 210 because cell phone 145 cannot display graphics and tables. Therefore, at step 330, filter and conversion tool 220', in addition to receiving a selection to remove footer portions and revision type of information, receives a selection to remove graphic type information and table type information.

At step 340, first portion of filter and conversion tool 220', in addition to removing "call forwarding instructions.doc", the page number, and "Lift telephone," also removes the graphic and the table from source document 210.

At step 350, second portion of filter and conversion tool 220' converts the modified source file to an HTML file 212'.

At step 360, HTML to XHMTL conversion tool 222 converts HTML file 212' to XHTML file 214'.

At step 370, XSLT transform engine 224 applies XSL Stylesheet 230' to XHTML file 214'. XSL Sytlesheet 230' includes a predefined display format, for example, a display format for display on a cell phone.

Program code (i.e., instructions) for performing the above-described methods may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the above-described processes. When implemented on a general-purpose processor, the program code combines with the processor to provide a unique apparatus that operates analogously to specific logic circuits.

It is noted that the foregoing description has been provided merely for the purpose of explanation and is not to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A computer-implemented method for file conversion comprising:
   reading by at least one processor a first file corresponding to a first application that displays the first file with a first display format, the first application being a non-Hypertext Markup Language based application, the first file comprising a first digital content item and a corresponding first indication of style to be applied to the first digital content item wherein the first file comprises one of a word processing file, a spreadsheet file, and a presentation file;
   converting the first file to a second file comprising the first digital content item and a Hypertext Markup Language tag based on the first style indication of the first file; and
   modifying the second file to create a third file comprising Extensible Hypertext Markup Language tags, the third file readable by a second application that displays the third file based on the Extensible Hypertext Markup Language tags;
   modifying the third file with an Extensible Stylesheet Language Transformation engine by applying a stylesheet comprising Extensible Stylesheet Language to the third file to produce a fourth file containing Extensible Hypertext Markup Language tags, wherein the stylesheet specifies a predefined display format for the fourth file that pertains to the Hypertext Markup Language tag and that differs from a display format of the third file.

2. The method as recited in claim 1, wherein reading the first file comprises receiving a compressed file and uncompressing the compressed file to yield the first file.

3. The method as recited in claim 2, further comprising compressing the third file.

4. The method as recited in claim 1, wherein converting the first file comprises processing the second file with a Hypertext Markup Language Tidy application.

5. The method as recited in claim 1, wherein the second application is a browser.

6. The method as recited in claim 1, wherein the second application displays the second digital content item on one of a digital appliance, a cell phone, and a personal digital assistant.

7. A system for file conversion, comprising:
   a filter and conversion tool implemented by at least one processor that is operable to read a first file corresponding to a first application, the first application being a non-Hypertext Markup Language based application, the first file comprising a first digital content item and a corresponding first indication of style to be applied to the first digital content item and converts the first file to a second file comprising the first digital content item and a Hypertext Markup Language (HTML) tag based on the first style indication of the first file, wherein the first file comprises one of a word processing file, a spreadsheet file, and a presentation file;
   an HTML to Extensible Hypertext Markup Language (XHTML) tool operable to convert the second file to a third file comprising XHTML tags;
   an Extensible Stylesheet Language Transformation (XSLT) engine operable to apply an Extensible Stylesheet Language (XSL) stylesheet to the third file to yield a fourth file comprising XHTML tags, wherein the stylesheet specifies a predefined display format for the fourth file that pertains to the Hypertext Markup Language tag and that differs from a display format of the third file.

8. The system as recited in claim 7, wherein the fourth file is displayable on one of a computer browser, a digital appliance, a cell phone, and a personal digital assistant.

9. The system as recited in claim 7, wherein the HTML to XHTML tool comprises an HTML Tidy tool.

10. The system as recited in claim 7, further comprising a compression application operable to receive a compressed file and uncompress the compressed file to yield the first file.

11. The system as recited in claim 7, wherein the filter and conversion tool is operable to modify the first file to remove at least one of revision information, graphic information, and table information from the first file.

12. The system as recited in claim 7, wherein the first file comprises a plurality of portions and the filter and conversion tool is operable to modify the first file to remove a digital content item from at least one of a header portion, a footer portion, and a body portion from the first file.

13. A computer-readable medium having computer-readable instructions thereon for file conversion, the computer-readable instructions when executed on at least one processor performing the following:

reading by the at least one processor a first file corresponding to a first application, the first application being a non-Hypertext Markup Language based application, that displays the first file with a first display format, the first file comprising a first digital content item and a corresponding first indication of style to be applied to the first digital content item, wherein the first file comprises one of a word processing file, a spreadsheet file, and a presentation file;

converting the first file to a second file comprising the first digital content item and a Hypertext Markup Language tag based on the first style indication of the first file;

modifying the second file to create a third file comprising Extensible Hypertext Markup Language tags, the third file readable by a second application that displays the third file based on the Extensible Markup Language tags; and modifying the third file with an Extensible Stylesheet Language Transformation engine by applying a stylesheet comprising Extensible Stylesheet Language to the third file to produce a fourth file containing Extensible Hypertext Markup Language tags, wherein the stylesheet specifies a predefined display format for the fourth file that pertains to the Hypertext Markup Language tag and that differs from a display format of the third file.

14. The computer-readable medium as recited in claim 13, wherein converting the first file comprises processing the second file with a Hypertext Markup Language Tidy application.

15. The computer-readable medium as recited in claim 13, wherein the second application displays the second digital content item on one of a digital appliance, a cell phone, and a personal digital assistant.

* * * * *